United States Patent
Lantz et al.

(10) Patent No.: US 7,237,949 B2
(45) Date of Patent: Jul. 3, 2007

(54) TYMPANIC THERMOMETER PROBE COVER

(75) Inventors: Loren Lantz, St. Charles, MO (US); James Harr, Foristell, MO (US); Mark Davis, St. Paul, MO (US)

(73) Assignee: Sherwood Services AG (CH)

( * ) Notice: Subject to any disclaimer, the term of this patent is extended or adjusted under 35 U.S.C. 154(b) by 39 days.

(21) Appl. No.: 10/538,314

(22) PCT Filed: Jan. 6, 2003

(86) PCT No.: PCT/US03/00224

§ 371 (c)(1),
(2), (4) Date: Jun. 13, 2005

(87) PCT Pub. No.: WO2004/063686

PCT Pub. Date: Jul. 29, 2004

(65) Prior Publication Data

US 2006/0159155 A1    Jul. 20, 2006

(51) Int. Cl.
G01K 1/08    (2006.01)
G01K 1/14    (2006.01)

(52) U.S. Cl. .................................... 374/158; 374/208
(58) Field of Classification Search ................ 374/158, 374/208
See application file for complete search history.

(56) References Cited

U.S. PATENT DOCUMENTS

| | | | |
|---|---|---|---|
| 3,949,740 A | 4/1976 | Twentier | |
| 4,457,633 A | 7/1984 | Andrews | |
| 4,662,360 A | 5/1987 | O'Hara et al. | |
| 4,911,559 A | 3/1990 | Meyst et al. | |
| 5,018,872 A | 5/1991 | Suszynski et al. | |
| D318,812 S | 8/1991 | Matsuura et al. | |
| 5,066,142 A | 11/1991 | DeFrank et al. | |
| 5,088,834 A | 2/1992 | Howe et al. | |
| 5,100,018 A | 3/1992 | Rosati et al. | |

(Continued)

FOREIGN PATENT DOCUMENTS

EP    0 201 790 A2    11/1986

(Continued)

Primary Examiner—Gail Verbitsky

(57) ABSTRACT

A probe cover (20) is provided including a tubular body extending from a proximal end (24) to a distal end (26). The proximal end defines an opening configured for receipt of a distal end of a thermometer. The distal end of the tubular body is substantially enclosed by a film (36). The distal end includes at least one end rib (38) disposed about an inner circumference thereof. At least one end rib is configured to engage the distal end of the thermometer such that the distal end of the thermometer is spaced apart from the film. The body may extend in a tapered configuration from the proximal end to the distal end. The end rib can include a transverse portion disposed along a surface of the film. The end rib may include a longitudinal portion extending along the body. The longitudinal portion may extend proximally along the body and the transverse portion may project along a surface of the film such that the longitudinal portion and the transverse portion cooperate to receive the distal end of the thermometer. The body may define at least one longitudinal rib projecting from an inner surface thereof. The body may define at least one protuberance projecting from an inner and/or an outer surface thereof. The longitudinal rib and/or the protuberances can be configured to facilitate nesting of a second probe cover.

14 Claims, 9 Drawing Sheets

U.S. PATENT DOCUMENTS

| | | | |
|---|---|---|---|
| 5,163,418 A | 11/1992 | Fraden et al. | |
| 5,179,936 A | 1/1993 | O'Hara et al. | |
| 5,188,459 A | 2/1993 | Mino et al. | |
| 5,318,029 A * | 6/1994 | Palese | 600/399 |
| 5,411,032 A | 5/1995 | Esseff et al. | |
| 5,487,607 A | 1/1996 | Makita et al. | |
| 5,516,010 A | 5/1996 | O'Hara et al. | |
| 5,645,350 A | 7/1997 | Jang | |
| 5,795,067 A | 8/1998 | Fraden et al. | |
| 5,795,632 A | 8/1998 | Buchalter | |
| 5,833,367 A | 11/1998 | Cheslock et al. | |
| 5,906,437 A | 5/1999 | Lin | |
| 5,980,451 A | 11/1999 | O'Hara et al. | |
| 6,001,066 A | 12/1999 | Canfield et al. | |
| 6,022,140 A | 2/2000 | Fraden et al. | |
| 6,030,117 A | 2/2000 | Cheslock et al. | |
| 6,097,979 A | 8/2000 | Janotte | |
| 6,123,454 A | 9/2000 | Canfield et al. | |
| 6,139,182 A | 10/2000 | Levatter et al. | |
| 6,152,596 A | 11/2000 | Fraden | |
| 6,156,148 A | 12/2000 | Beerwerth et al. | |
| 6,195,581 B1 * | 2/2001 | Beerwerth et al. | 600/474 |
| 6,224,256 B1 | 5/2001 | Bala | |
| 6,238,088 B1 | 5/2001 | Wu | |
| 6,254,271 B1 | 7/2001 | Lin | |
| 6,319,206 B1 | 11/2001 | Pompei et al. | |
| 6,386,757 B1 * | 5/2002 | Konno | 374/158 |
| 6,390,671 B1 | 5/2002 | Tseng | |
| 6,416,602 B1 | 7/2002 | Firatli | |
| 6,647,284 B1 | 11/2003 | Lee | |
| 6,695,474 B2 | 2/2004 | Beerwerth et al. | |
| 6,786,636 B1 | 9/2004 | Huang et al. | |
| 7,108,419 B2 * | 9/2006 | Harr | 374/121 |
| 2001/0017880 A1 | 8/2001 | Beerwerth et al. | |
| 2002/0176478 A1 | 11/2002 | Tabata | |
| 2003/0067957 A1 | 4/2003 | Ko et al. | |
| 2003/0176809 A1 * | 9/2003 | Lin | 600/549 |
| 2005/0002437 A1 | 1/2005 | Fraden | |
| 2005/0083991 A1 | 4/2005 | Wong | |

FOREIGN PATENT DOCUMENTS

| | | |
|---|---|---|
| EP | 0 589 212 B1 | 3/1997 |
| EP | 0 890 829 A1 | 1/1999 |
| EP | 1 118 306 A1 | 7/2001 |

* cited by examiner

TYMPANIC THERMOMETER PROBE COVER

CROSS-REFERENCE TO RELATED APPLICATIONS

This patent application incorporates by reference PCT Application No. PCT/US03/00224, Express Mail Label No. EV222416345US, filed in the U.S. Patent and Trademark Office on Jan. 6, 2003, the entire contents of which is hereby incorporated by reference herein.

BACKGROUND

1. Technical Field

The present disclosure generally relates to the field of biomedical thermometers, and more particularly, to a probe cover for a tympanic thermometer.

2. Description of the Related Art

Medical thermometers are typically employed to facilitate the prevention, diagnosis and treatment of diseases, body ailments, etc. for humans and other animals, as is known. Doctors, nurses, parents, care providers, etc. utilize thermometers to measure a subject's body temperature for detecting a fever, monitoring the subject's body temperature, etc. An accurate reading of a subject's body temperature is required for effective use and should be taken from the internal or core temperature of a subject's body. Several thermometer devices are known for measuring a subject's body temperature, such as, for example, glass, electronic, ear (tympanic).

Glass thermometers, however, are very slow in making measurements, typically requiring several minutes to determine body temperature. This can result in discomfort to the subject, and may be very troublesome when taking the temperature of a small child or an invalid. Further, glass thermometers are susceptible to error and are typically accurate only to within a degree.

Electronic thermometers minimize measurement time and improve accuracy over glass thermometers. Electronic thermometers, however, still require approximately thirty (30) seconds before an accurate reading can be taken and may cause discomfort in placement as the thermometer device must be inserted into the subject's mouth, rectum or axilla.

Tympanic thermometers are generally considered by the medical community to be superior for taking a subject's temperature. Tympanic thermometers provide rapid and accurate readings of core temperature, overcoming the disadvantages associated with other types of thermometers. Tympanic thermometers measure temperature by sensing infrared emissions from the tympanic membrane (eardrum) in the external ear canal. The temperature of the tympanic membrane accurately represents the body's core temperature. Further, measuring temperature in this manner only requires a few seconds.

In operation, a tympanic thermometer is prepared for use and a probe cover is mounted onto a sensing probe extending from a distal portion of the thermometer. The probe covers are hygienic to provide a sanitary barrier and are disposable after use. A practitioner or other care provider inserts a portion of the probe having the probe cover mounted thereon within a subject's outer ear canal to sense the infrared emissions from the tympanic membrane. The infrared light emitted from the tympanic membrane passes through a window of the probe cover and is directed to the sensing probe by a waveguide. The window is typically a transparent portion of the probe cover and has a wavelength in the far infrared range.

The practitioner presses a button or similar device to cause the thermometer to take a temperature measurement. The microelectronics process electrical signals provided by the heat sensor to determine eardrum temperature and render a temperature measurement in a few seconds or less. The probe is removed from the ear canal and the probe cover discarded.

Known tympanic thermometers typically include a probe containing a heat sensor such as a thermopile, a pyroelectric heat sensor, etc. See, for example, U.S. Pat. Nos. 6,179,785, 6,186,959, and 5,820,264. These types of heat sensors are particularly sensitive to the eardrum's radiant heat energy.

The accuracy with which the sensing probe senses the infrared radiation emitted by the eardrum directly corresponds with the overall accuracy, repeatability and usability of the tympanic thermometer. The sensing probe must be sensitive to the low level of infrared energy emitted by an eardrum while providing a high degree of accuracy, repeatability and thermal noise immunity.

Current tympanic thermometers employ probe covers that may adversely affect accuracy of a temperature reading. The probe cover window of the probe cover typically engages the probe. Consequently, the distal end of the probe can become disadvantageously heated by the tympanic membrane. This may cause the sensing probe to detect radiation emitted from the heated distal end of the probe or other undesirable thermal noise readings that can lead to inaccurate temperature measurement. Further, current probe cover designs suffer from other drawbacks, such as poor retention characteristics with the probe and subject discomfort when inserted in the ear canal.

Therefore, it would be desirable to overcome the disadvantages and drawbacks of the prior art with a probe cover for a tympanic thermometer that minimizes heat transfer to the probe and enhances comfort to the subject. It would be highly desirable if the probe cover was designed for multiple stacking to facilitate storage. It is contemplated that the probe cover is easily and efficiently fabricated.

SUMMARY

Accordingly, a probe cover is provided for a tympanic thermometer that minimizes heat transfer to the probe and enhances comfort to a subject for overcoming the disadvantages and drawbacks of the prior art. Desirably, the probe cover is capable of multiple stacking to facilitate storage. The probe cover is easily and efficiently fabricated. The present disclosure resolves related disadvantages and drawbacks experienced in the art.

In one particular embodiment, in accordance with the principles of the present disclosure, a probe cover is provided, including a tubular body extending from a proximal end to a distal end. The proximal end defines an opening configured for receipt of a distal end of a thermometer. The distal end of the tubular body is substantially enclosed by a film. The distal end includes at least one end rib disposed about an inner circumference thereof. The at least one end rib is configured to engage the distal end of the thermometer such that the distal end of the thermometer is spaced apart from the film. An outer circumference of the distal end of the body may have an arcuate surface. The distal end of the body may include a plurality of end ribs disposed about its inner circumference. The body may extend in a tapered configuration from the proximal end to the distal end.

The end rib can include a transverse portion disposed along a surface of the film. The end rib may include a longitudinal portion extending along the body. The longitudinal portion may extend proximally along the body and the transverse portion may project along a surface of the film such that the longitudinal portion and the transverse portion cooperate to receive the distal end of the thermometer.

The body may define at least one longitudinal rib projecting from an inner surface thereof. The at least one longitudinal rib is proximally spaced from the distal end of the body. The body may define a plurality of longitudinal ribs projecting from an inner circumferential surface thereof. The plurality of longitudinal ribs are proximally spaced from the distal end of the body. The longitudinal ribs can be configured to facilitate nesting of a second probe cover.

Alternatively, the body may define at least one protuberance projecting from an inner surface thereof. The at least one protuberance is proximally spaced from the distal end of the body. The body can define a plurality of protuberances projecting from the inner circumferential surface thereof. The plurality of protuberances are proximally spaced from the distal end of the body. The protuberances can be configured to facilitate nesting of a second probe cover.

Alternatively, the body may define at least one protuberance projecting from an outer surface thereof. The at least one protuberance is proximally spaced from the distal end of the body. The body can define a plurality of protuberances projecting from the outer circumferential surface thereof. The plurality of protuberances are proximally spaced from the distal end. The protuberances can be configured to facilitate nesting of a second probe cover. The body may also include a plurality of protuberances projecting from the inner surface that are configured to facilitate nesting with a third probe cover.

In an alternate embodiment, the probe cover includes a tubular body portion extending in a tapered configuration from a proximal end to a distal end. The proximal end defines an opening configured for receipt of a distal end of a tympanic thermometer. The distal end is substantially enclosed by a film and includes a plurality of end ribs disposed about an inner circumference of the body portion. The end ribs have a longitudinal portion extending proximally along the body portion and a transverse portion projecting along a transverse surface of the film. The longitudinal portion and the transverse portion are configured to receivably engage the distal end of the tympanic thermometer for support therein such that the distal end of the tympanic thermometer is spaced apart from the film.

In another alternate embodiment, the body portion defines a plurality of protuberances projecting from an inner surface and an outer surface of the body portion. The protuberances are proximally spaced from the distal end and disposed circumferentially about a wall of the body portion. The protuberances disposed on the outer surface are configured to facilitate nesting of a second probe cover. The protuberances disposed on the inner surface are configured to facilitate nesting with a third probe cover.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings wherein:

DETAILED DESCRIPTION OF EXEMPLARY EMBODIMENTS

Figure 1:
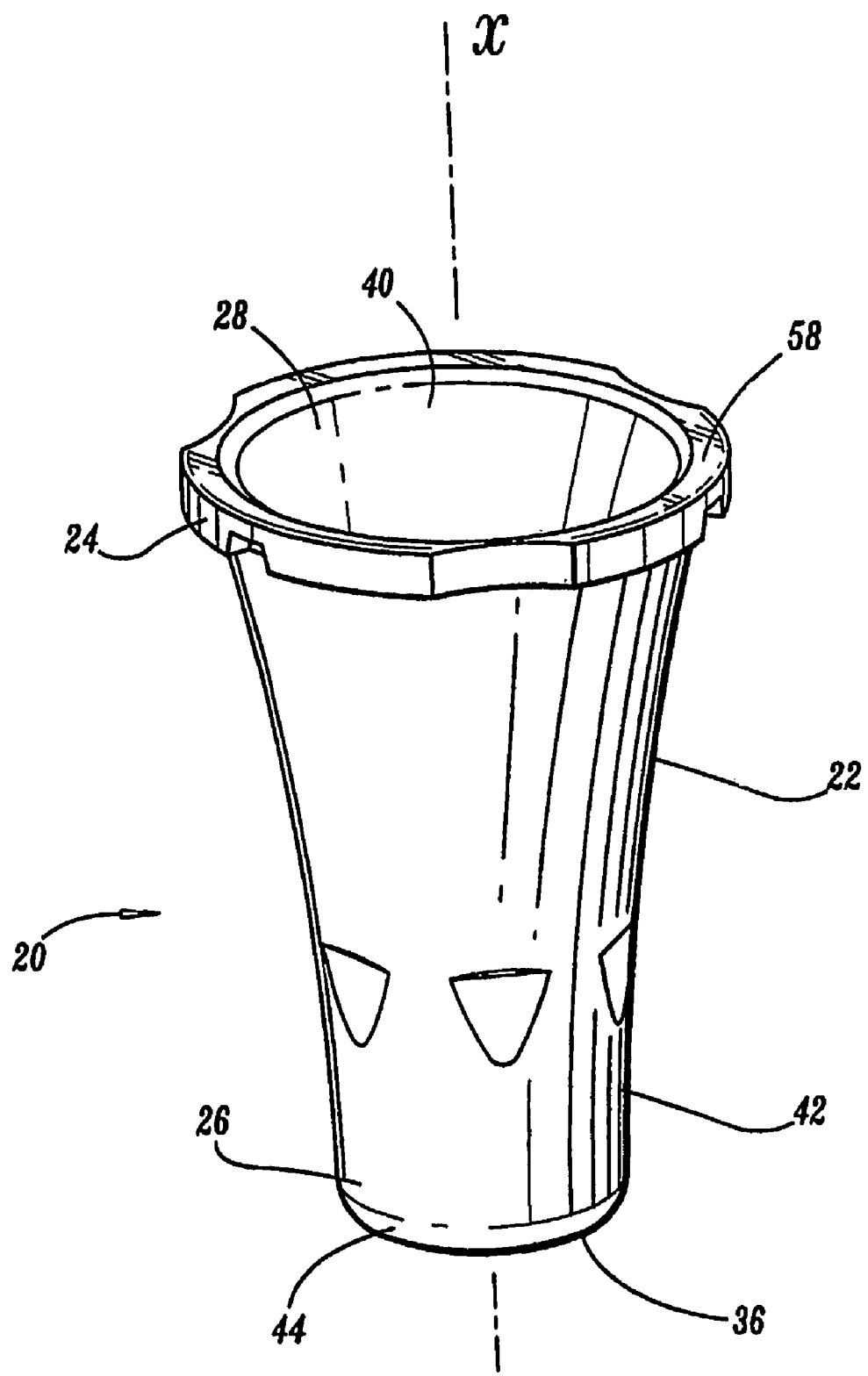
FIG. 1 is a perspective view of a probe cover, in accordance with the principles of the present disclosure.
Figure 2:
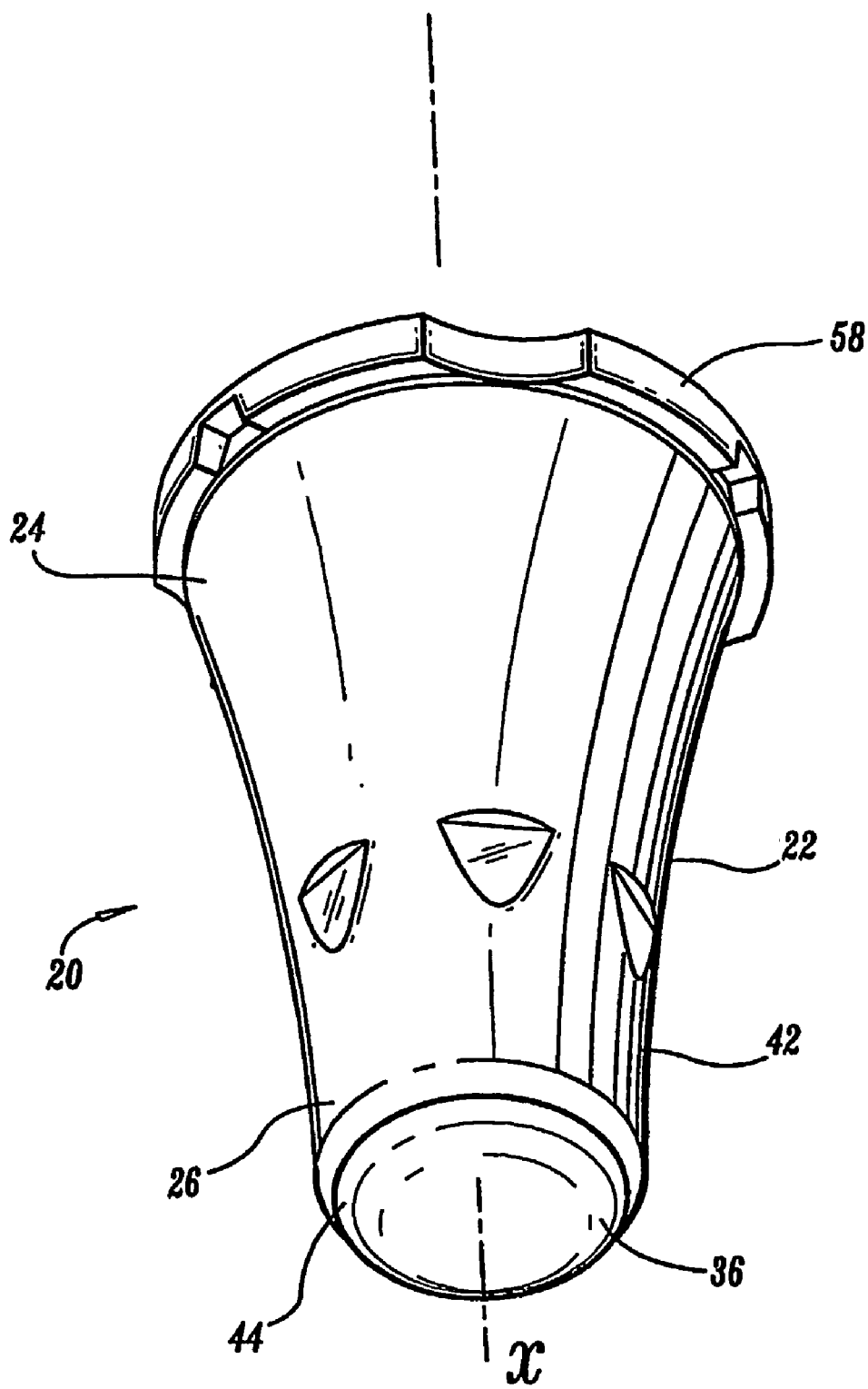
FIG. 2 is an alternate perspective view of the probe cover shown in FIG. 1.
Figure 4:
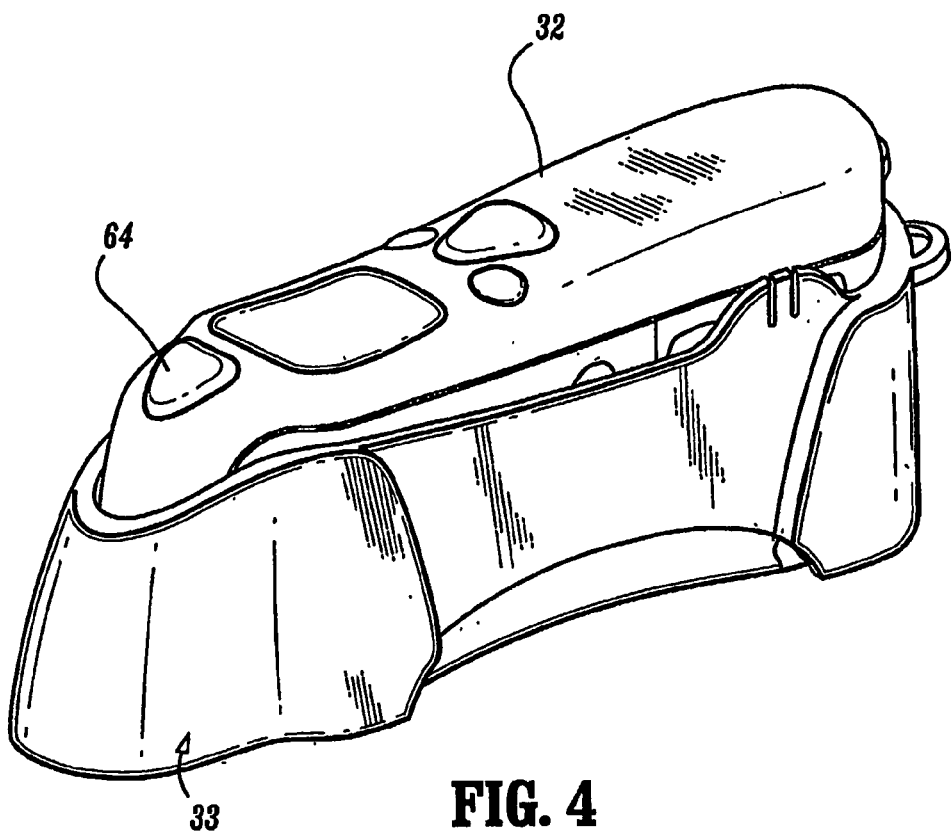
FIG. 4 is a perspective view of the tympanic thermometer, shown in FIG. 3, mounted to a holder.

The exemplary embodiments of the probe cover and methods of use disclosed are discussed in terms of medical thermometers for measuring body temperature, and more particularly, in terms of a probe cover employed with a tympanic thermometer that minimizes heat transfer to a probe of a tympanic thermometer. It is contemplated that the probe cover of the present disclosure enhances comfort to a subject during body temperature measurement and minimizes disease, bacteria, etc. propagation. It is envisioned that the present disclosure finds application for the prevention, diagnosis and treatment of diseases, body ailments, etc. of a subject. It is further envisioned that the principles relating to the probe cover disclosed include easy and efficient storage thereof such as, for example, stacking and nesting of multiple probe covers.

In the discussion that follows, the term "proximal" will refer to the portion of a structure that is closer to a practitioner, while the term "distal" will refer to the portion that is further from the practitioner. As used herein, the term "subject" refers to a human patient or other animal having its body temperature measured. According to the present disclosure, the term "practitioner" refers to a doctor, nurse, parent or other care provider utilizing a tympanic thermometer to measure a subject's body temperature, and may include support personnel.

The component portions of the probe cover, which is disposable, are fabricated from materials suitable for measuring body temperature via the tympanic membrane with a tympanic thermometer measuring apparatus. These materials may include, for example, plastic materials, such as, for example, polypropylene, polyethylene, etc., depending on the particular temperature measurement application and/or preference of a practitioner. For example, a body of the probe cover can be fabricated from high density polyethylene (HDPE).

The probe cover has a window portion or film that can be fabricated from a material substantially transparent to infrared radiation and impervious to moisture, ear wax, bacteria, etc. The film, for example, is fabricated from low density polyethylene (LDPE) and has a thickness in the range of 0.0005 to 0.001 inches, although other ranges are contemplated. The film may be semi-rigid or flexible, and can be monolithically formed with the remaining portion of the probe cover or integrally connected thereto via, for example, thermal welding, etc. One skilled in the art, however, will realize that other materials and fabrication methods suitable for assembly and manufacture of the probe cover, in accordance with the present disclosure, also would be appropriate.

Reference will now be made in detail to the exemplary embodiments of the present disclosure, which are illustrated in the accompanying figures. Turning now to the figures wherein like components are designated by like reference numerals throughout the several views and initially to FIGS. 1-4, there is illustrated a probe cover 20, in accordance with the principles of the present disclosure.

Probe cover 20 defines a longitudinal axis x and includes a cylindrical tubular body 22, which extends in a tapered configuration from a proximal end 24 to a distal end 26. This design advantageously enhances comfort to a subject (not shown) during a temperature measurement procedure. It is contemplated that probe cover 20 may be generally cylindrical, frustoconical or otherwise tapered or curved for insertion within the ear of the subject. Proximal end 24 defines an opening 28 configured for receipt of a distal end 30 of a tympanic thermometer 32, such as, for example, a heat sensing probe 34. Heat sensing probe 34 is configured to detect infrared energy emitted by the tympanic membrane of the subject.

It is contemplated that tympanic thermometer 32 may include a waveguide to facilitate sensing of the tympanic membrane heat energy. Tympanic thermometer 32 is releasably mounted in a holder 33 for storage in contemplation for use. Tympanic thermometer 32 and holder 33 may be fabricated from semi-rigid, rigid plastic and/or metal materials suitable for temperature measurement and related use. It is envisioned that holder 33 may include the electronics necessary to facilitate powering of tympanic thermometer 32, including, for example, battery charging capability, etc.

Distal end 26 is substantially enclosed by a film 36. Film 36 is substantially transparent to infrared radiation and configured to facilitate sensing of infrared emissions by heat sensing probe 34. Film 36 is advantageously impervious to ear wax, moisture and bacteria to prevent disease propagation. Distal end 26 includes end ribs 38 (FIG. 5) disposed about an inner circumferential surface 40 of tubular body 22. End ribs 38 are configured to engage heat sensing probe 34 such that heat sensing probe 34 is spaced apart from film 36, as will be discussed. As probe cover 20 is mounted onto heat sensing probe 34, end ribs 38 deform to cause film 36 to become radially taught, smooth and free of wrinkles. This configuration advantageously minimizes heat transfer to heat sensing probe 34 to avoid distorted readings and interference from thermal noise. Thus, accuracy is improved during temperature measurement. End ribs 38 provide strength to probe cover 20 facilitating compliance of distal end 26 for enhancing comfort to the subject during insertion into an ear canal of the subject.

Tubular body 22 has an outer circumferential surface 42. Outer circumferential surface 42 includes an arcuate surface 44 adjacent distal end 26. Arcuate surface 44 enhances comfort and facilitates insertion of probe cover 20 with the ear canal. Arcuate surface 44 may have varying degrees of curvature according to the particular requirements of a temperature measurement application.

Figure 5:
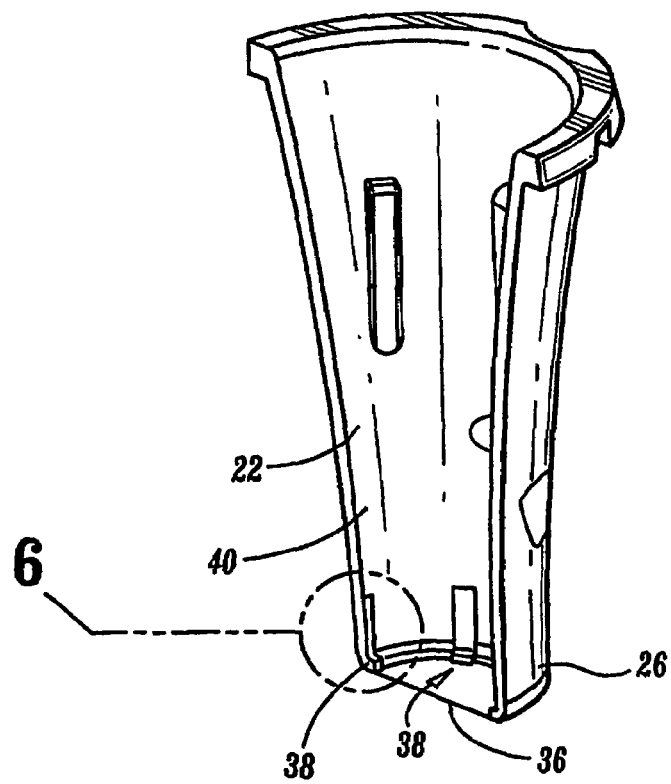
FIG. 5 is a cross-section of the probe cover, shown in FIG. 1, in perspective.
Figure 6:
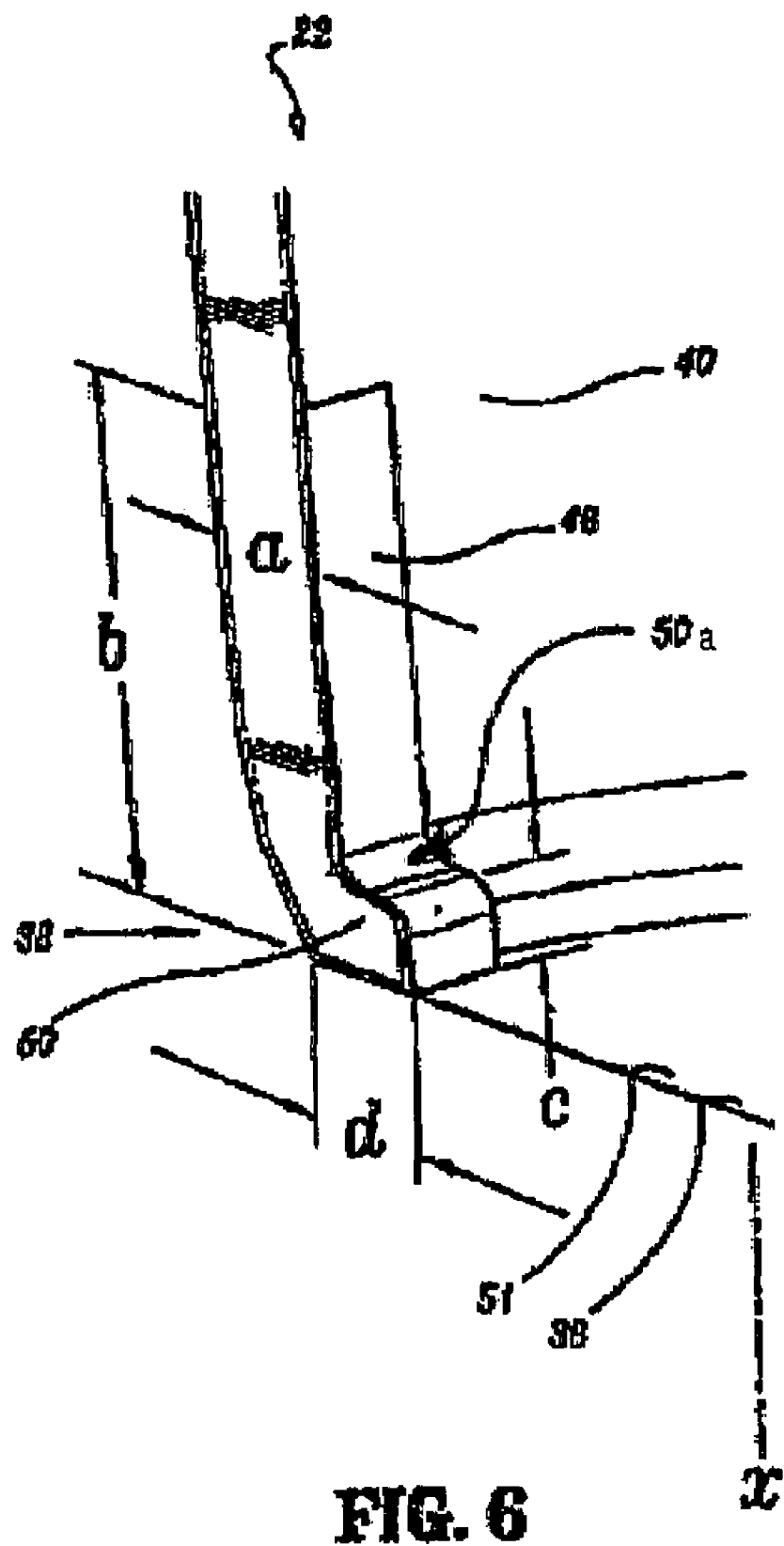
FIG. 6 is an enlarged perspective view of the indicated area of detail shown in FIG. 5.

Referring to FIGS. 5 and 6, end ribs 38 have a longitudinal portion 46 extending proximally along inner circumferential surface 40 of tubular body 22. Longitudinal portion 46 projects a thickness a and extends a length b along inner surface 40. Thickness a and length b facilitate support and engagement with heat sensing probe 34. It is envisioned that longitudinal portion 46 may have various thickness and length according to the particular temperature measurement application.

End ribs 38 have a transverse portion 50 projecting along a transverse surface 51, relative to longitudinal axis x, of film 36. Transverse portion 50 projects a thickness c and extends a length d along transverse surface 51 toward longitudinal axis x. Thickness c and length d facilitate support and engagement with heat sensing probe 34. It is envisioned that transverse portion 50 may have various thickness and length.

Longitudinal portion 46 and transverse portion 50 are configured to receivably engage heat sensing probe 34 for support therein such that heat sensing probe 34 is spaced apart from film 36. Thickness c provides the depth necessary to create an air/fluid gap or cavity between heat sensing probe 34 and film 36. This configuration prevents undesired engagement of film 36 with heat sensing probe 34. Advantageously, this design improves accuracy of temperature measurements and avoids distorted readings due to thermal noise, etc. It is contemplated that probe cover 20 may employ one or a plurality of end ribs 38. A proximal face 50a of the transverse portion 50 abuts the distal end 30 of the thermometer 32 when engaged with the probe cover 20 to keep the distal end 30 of the thermometer 32 spaced from the film 36.

Figure 9:
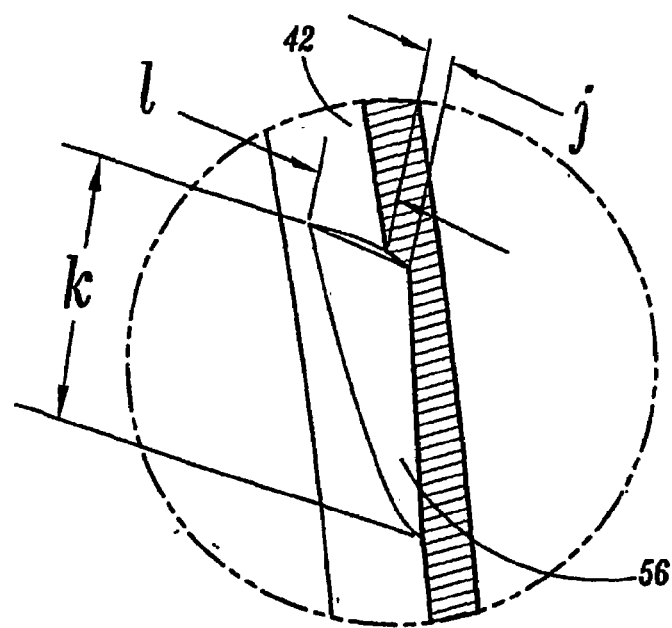
FIG. 9 is an enlarged perspective view of the indicated area of detail shown in FIG. 7.
Figure 7:
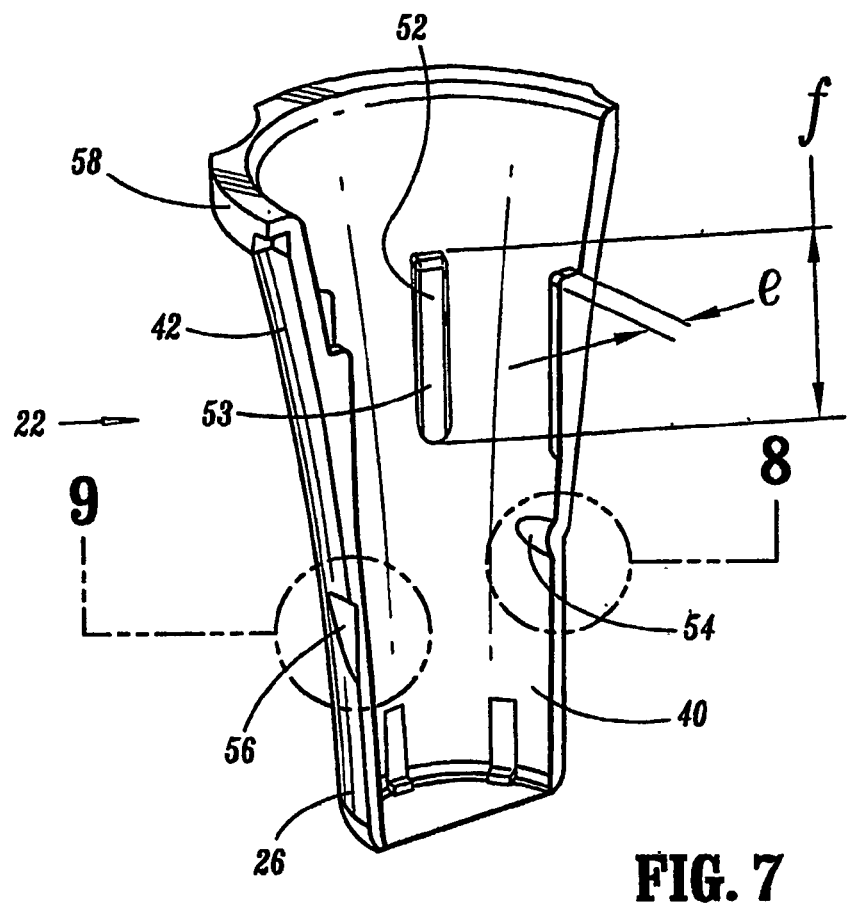
FIG. 7 is an alternate cross-section of the probe cover, shown in FIG. 1, in perspective.
Figure 8:
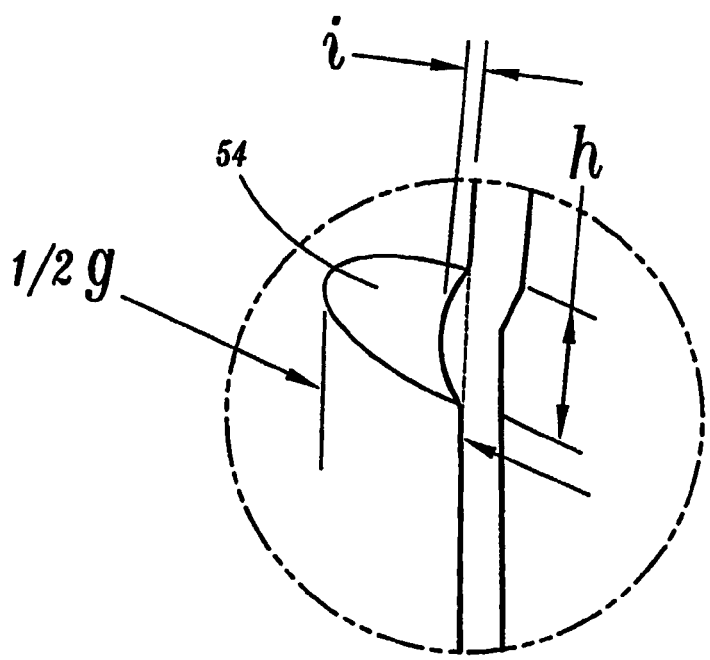
FIG. 8 is an enlarged perspective view of the indicated area of detail shown in FIG. 7.

Referring to FIGS. 7-9, body 22 defines longitudinal ribs 52 projecting from inner circumferential surface 40 and being proximally spaced from distal end 26. Longitudinal ribs 52 project a thickness e and extend a length f from inner circumferential surface 40. Longitudinal ribs 52 define a transverse face 53 that is configured to engage heat sensing probe 34. Thickness e, length f and transverse face 53 facilitate retention of probe cover 20 with heat sensing probe, 34. Longitudinal ribs 52 also provide a gap of separation between heat sensing probe 34 and outer circumferential surface 42, which is in close proximity to the tympanic membrane. This configuration minimizes undesirable heating of heat sensing probe 34. It is contemplated that one or a plurality of longitudinal ribs 52 may be used.

As shown at FIGS. 7, 8, 8A and 8B, body 22 defines inner protuberances 54 projecting from inner circumferential surface 40 and being proximally spaced from distal end 26. Inner protuberances 54 have an elliptical configuration including a width g (FIG. 8 shows ½ g due to the cross-section view) that is relatively larger than a height h. Inner protuberances 54 have a radial curvature projecting a thickness i from inner circumferential surface 40 for engaging heat sensing probe 34. Inner protuberances 54 facilitate retention of probe cover 20 with heat sensing probe 34. Inner protuberances 54 provide a gap 55 of separation between heat sensing probe 34 and the tympanic membrane. This configuration minimizes undesired heating of heat sensing probe 34. It is contemplated that one of a plurality of inner protuberances 54 may be used. Longitudinal ribs 52 and inner protuberances 54 may be variously dimensioned according to the particular requirements of a temperature measurement application.

Body 22 defines outer protuberances 56 projecting from outer circumferential surface 42 and being proximally spaced from distal end 26. Outer protuberances 56 have a width j that is relatively smaller than a height k. Outer protuberances 56 have a radial curvature projecting a thickness l from outer circumferential surface 42. Outer protuberances 56 facilitate stacking and resting of multiple probe covers 20 for storage, as will be discussed. It is contemplated that one or a plurality of protuberances 56 may be used.

Probe cover 20 includes a flange 58 disposed adjacent proximal end 24. Flange 58 is formed about the circumference of proximal end 24 providing strength and stability for mounting of probe cover 20 with tympanic thermometer 32. Flange 58 also facilitates packaging of multiple probe covers, as will be discussed.

Figure 10:
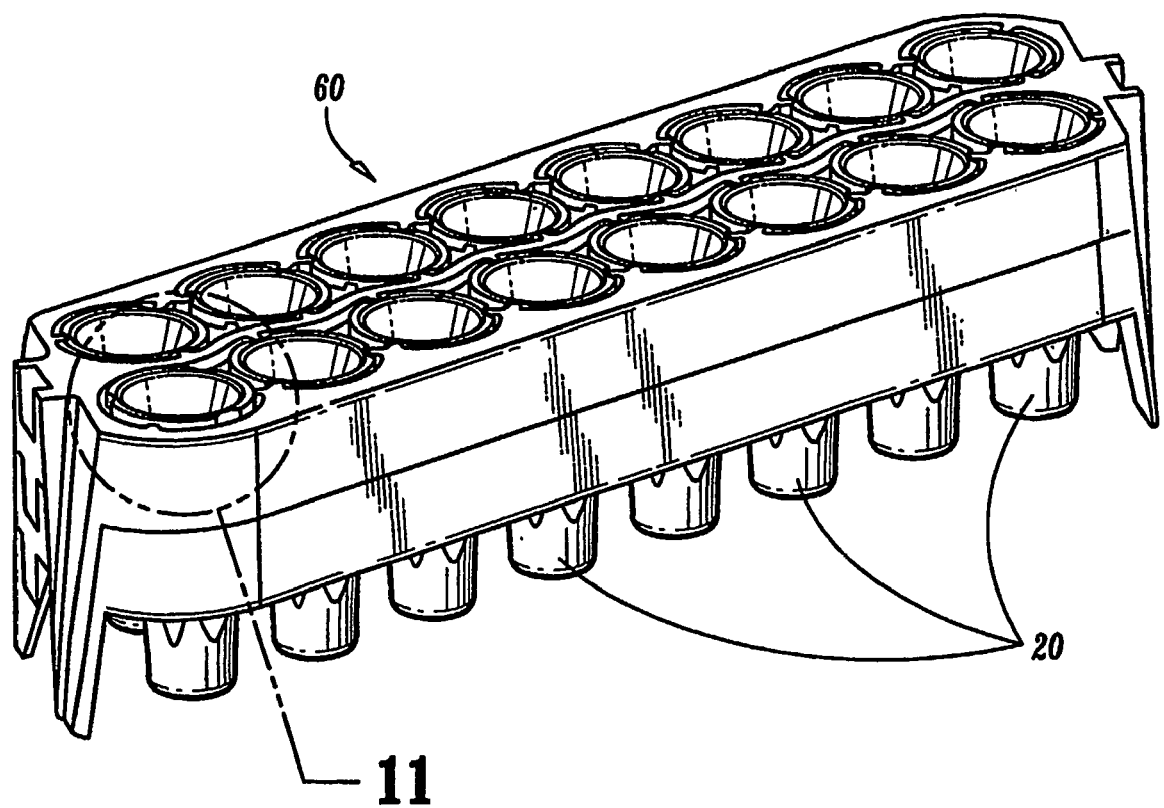
FIG. 10 is a perspective view of a cassette that supports multiple probe covers, shown in FIG. 1.
Figure 11:
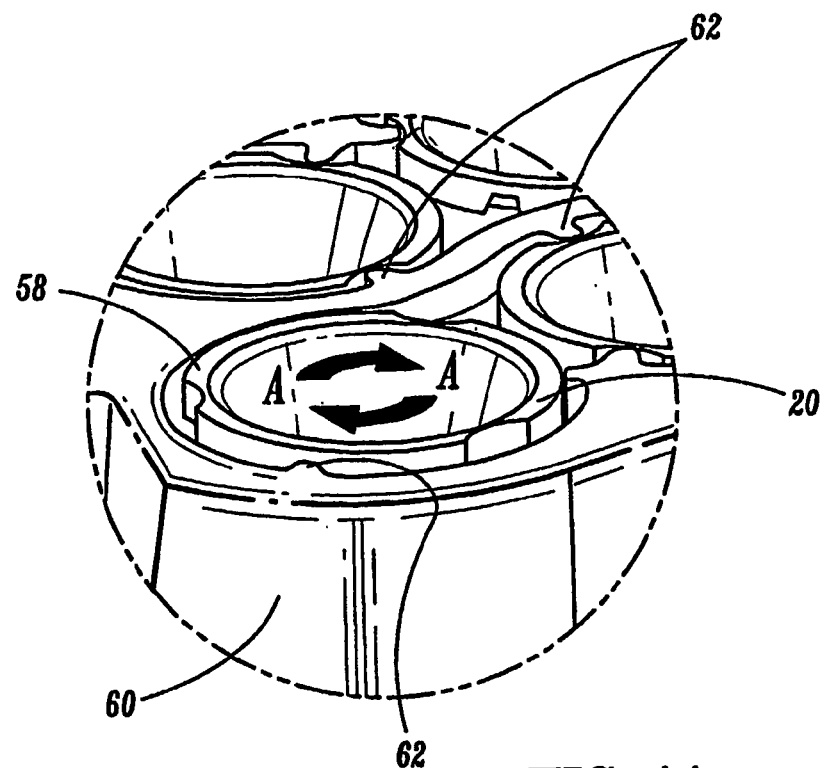
FIG. 11 is an enlarged perspective view of the indicated area of detail shown in FIG. 10.
Figure 12:
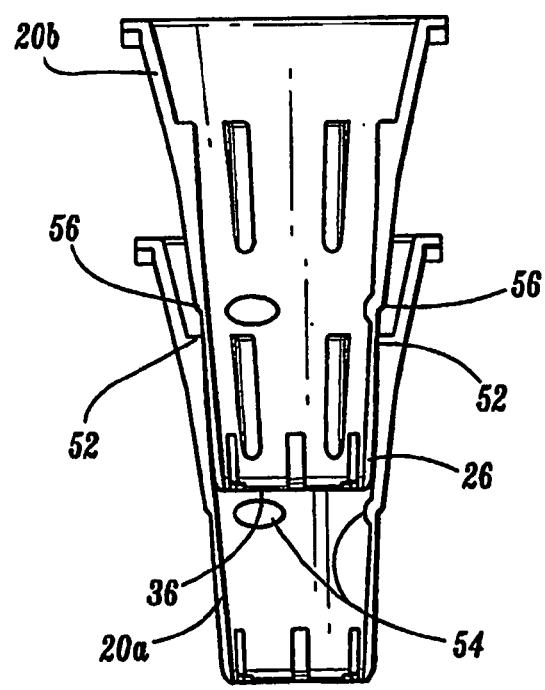
FIG. 12 is a side cross-sectional view of the probe cover shown in FIG. 1, nested with a second probe cover.

Referring to FIGS. 10-12, probe covers 20, similar to that described, are fabricated, prepared for storage, shipment and use. It is envisioned that probe covers 20 may be sterilized. Probe covers 20 are provided via a cassette 60. Cassette 60, including probe covers 20, are fabricated for releasable attachment therewith. Flange 58 of probe covers 20 is attached to cassette 60 via stems 62. Stems 62 are frangible such that a probe cover 20 is removed from cassette 60 by twisting probe cover 20, in the direction shown by arrows A. Twist or rotation of probe cover 20 causes stems 62 to plastically deform and break from cassette 60. Other methods of manipulation of probe covers 20 may be used for removal. Cassette 60 can be discarded after probe covers 20 are removed.

Figure 3:
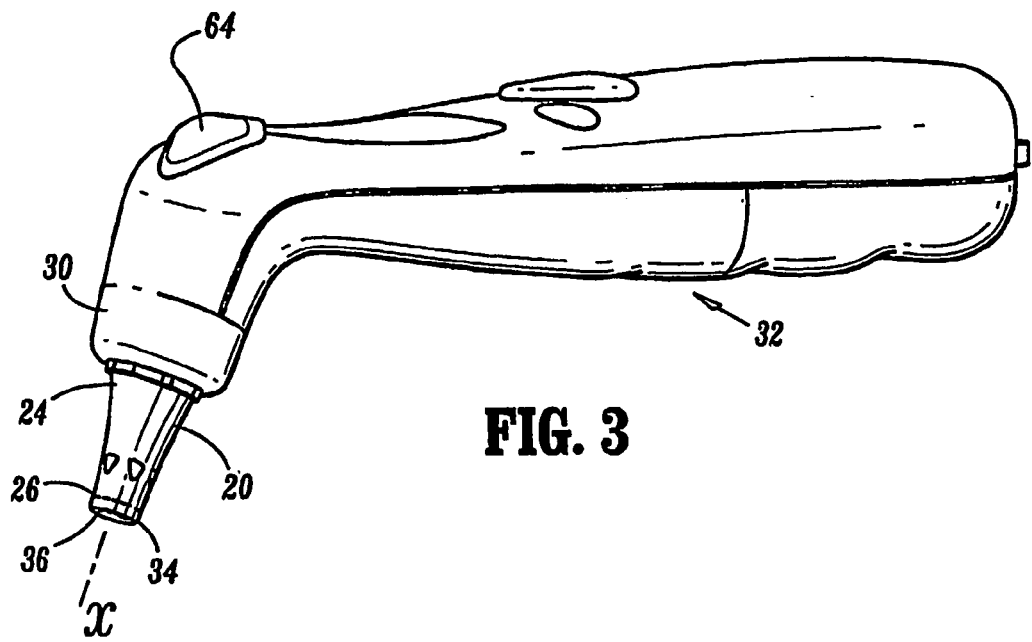
FIG. 3 is a perspective view of the probe cover, shown in FIG. 1, mounted to a tympanic thermometer.

Probe covers 20 are attached and stored for easy and efficient use with tympanic thermometer 32 (FIG. 3). Probe covers 20 are configured for nesting with a second, third, fourth, etc. probe cover 20. For example, as shown in FIG. 12, a first probe cover 20a is nested with a second probe cover 20b in a stacked configuration such that inner protuberances 54 of first probe cover 20a are caused to engage distal end 26 of probe cover 20b. Outer protuberances 56 of probe cover 20b are caused to engage longitudinal ribs 52 of probe cover 20a. This configuration facilitates nesting of multiple probe covers 20. Engagement of protuberances 54, 56 with an adjacent stacked probe cover 20 facilitates sufficient retention between probe covers 20a, b for nesting. This design also prevents probe cover 20b from becoming too far imbedded in adjacent probe cover 20a such that separation would not be possible.

Tympanic thermometer 32 is manipulated and removed from holder 33. With probe covers 20a and 20b in a nested configuration, heat sensing probe 34 of tympanic thermometer 32 is inserted within probe cover 20b. Inner protuberances 54, longitudinal ribs 52 and end ribs 38 engage heat sensing probe 34 for retention with probe cover 20b. This configuration provides sufficient retention between heat sensing probe 34 and probe cover 20b so that probe cover 20b is retained with heat sensing probe 34 and probe cover 20b is separated from probe cover 20a. Thus, the retention strength of inner protuberances 54, longitudinal ribs 52 and end ribs 38 with heat sensing probe 34 is greater than the retention strength between protuberances 54, 56 and adjacent probe cover 20a.

Figure 8A:
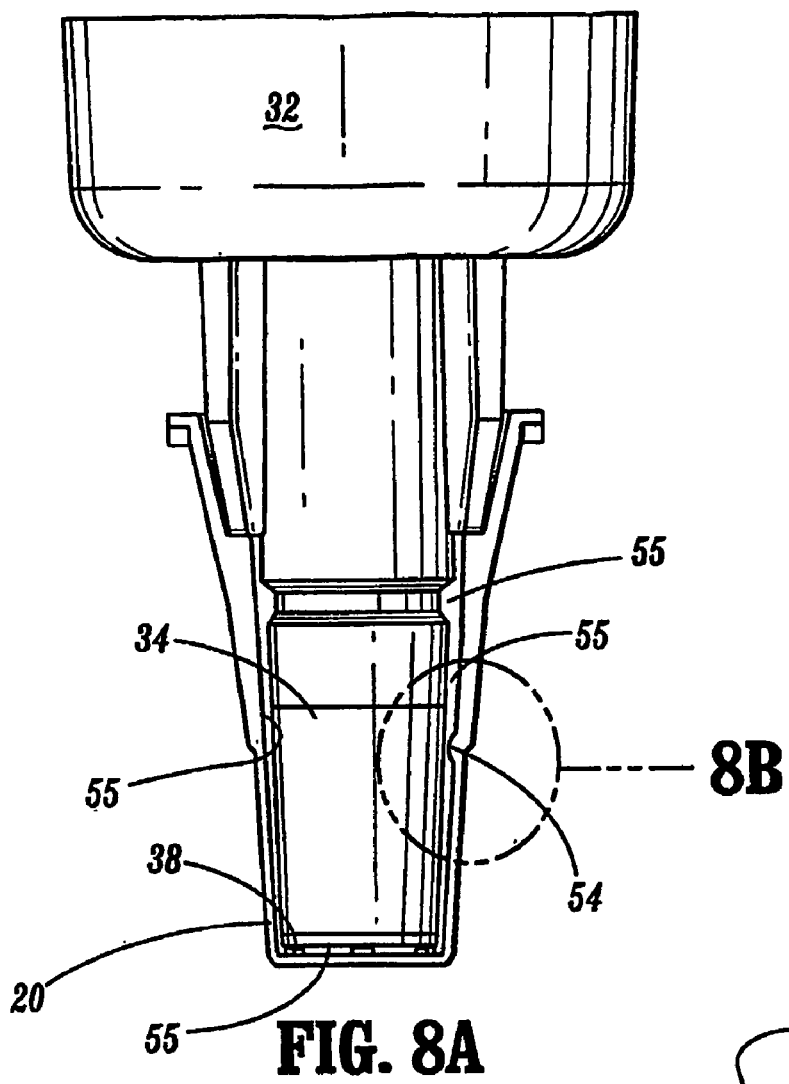
FIG. 8A is a cross-sectional view of the probe cover as mounted onto a tympanic thermometer.
Figure 8B:
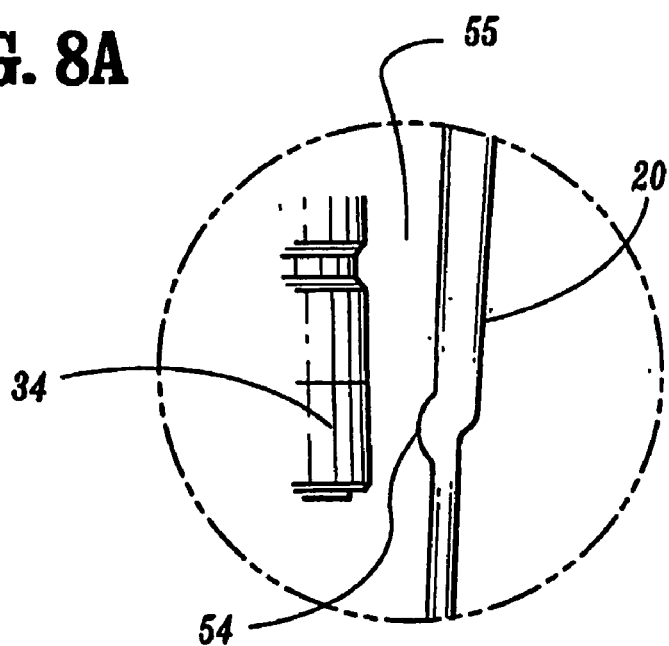
FIG. 8B is an enlarged cross-sectional view of the indicated area of detail shown in FIG. 8A.

Probe cover 20b is mounted with heat sensing probe 34 and film 36 is separated from direct engagement with heat sensing probe 34 via the air gap 55 created therebetween (FIGS. 8A and 8B). End ribs 38 engage heat sensing probe 34 to form the air gap 55 between probe 34 and film 36. This prevents undesired heat transfer to probe 34 to avoid distorted readings and thermal noise interference. This configuration advantageously facilitates a more accurate temperature measurement. Longitudinal ribs 52, inner protuberances 54 and outer protuberances 56 similarly prevent heat transfer to heat transfer probe 34 and provide retention strength therewith.

In operation, to measure a subject's (not shown) body temperature, a practitioner (not shown) pulls the subject's ear back gently to straighten the ear canal so that heat sensing probe 34 can visualize the tympanic membrane for reading body temperature via infrared emissions. Tympanic thermometer 32 is manipulated by the practitioner such that a portion of probe cover 20, mounted to heat sensing probe 34, is easily and comfortably inserted within the subject's outer ear canal. Heat sensing probe 34 is properly positioned to sense infrared emissions from the tympanic membrane that reflect the subject's body temperature. Infrared light emitted from the tympanic membrane passes through film 36 and is directed to heat sensing probe 34.

The practitioner presses button 64 of tympanic thermometer 32 for a sufficient period of time (typically 3-10 seconds) such that heat sensing probe 34 accurately senses infrared emissions from the tympanic membrane. Microelectronics of tympanic thermometer 32 process electronic signals provided by heat sensing probe 34 to determine the subject's body temperature. The microelectronics cause tympanic thermometer 32 to render body temperature measurement in a few seconds or less. Probe cover 20 is removed from heat sensing probe 34 and discarded.

Tympanic thermometer 32 may be reused and another probe cover, such as, probe cover 20a may be mounted to heat sensing probe 34. Thus, probe covers 20 provide a sanitary barrier to heat sensing probe 34 to prevent disease propagation from bacteria, etc. Other methods of use of tympanic thermometer 32 and probe cover 20 are envisioned, such as, for example, alternative positioning, orientation, etc.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A probe cover comprising:
a tubular body portion extending in a tapered configuration from a proximal end to a distal end, the proximal end defining an opening configured for receipt of a distal end of a tympanic thermometer, and
the distal end being substantially enclosed by a film and including a plurality of non-continuous end ribs being circumferentially spaced apart and disposed about an inner circumferential surface thereof,
the end ribs having a longitudinal portion extending proximally along the tubular body portion and a transverse portion being transverse relative to the longitudinal axis of the tubular body and projecting along a transverse surface of the film, the longitudinal portion and the transverse portion being configured to receivably engage the distal end of the tympanic thermometer for support therein such that the distal end of the tympanic thermometer is spaced apart from the film at a predetermined space, wherein the predetermined space is defined by the distance from a proximal face of the transverse portion to the film.

2. A probe cover as recited in claim 1, wherein an outer circumference of the distal end of the body has an arcuate surface.

3. A probe cover as recited in claim 1, wherein at least one of said plurality of longitudinal ribs are being proximally spaced from the distal end of the body.

4. A probe cover as recited in claim 1, wherein said plurality of longitudinal ribs projecting from the inner circumferential surface and being proximally spaced from the distal end of the body.

5. A probe cover as recited in claim 4, wherein the longitudinal ribs are configured to facilitate nesting of a second probe cover.

6. A probe cover as recited in claim 1, wherein the body defines at least one protuberance projecting from an inner surface thereof, the least one protuberance being proximally spaced from the distal end of the body.

7. A probe cover as recited in claim 1, wherein the body defines a plurality of protuberances projecting from an inner circumferential surface thereof, the plurality of protuberances being proximally spaced from the distal end of the body.

8. A probe cover as recited in claim 7, wherein the protuberances are configured to facilitate nesting of a second probe cover.

9. A probe cover as recited in claim 1, wherein the body defines at least one protuberance projecting from an outer surface thereof, the at least one protuberance being proximally spaced from the distal end of the body.

10. A probe cover as recited in claim 1, wherein the body defines a plurality of protuberances projecting from an outer circumferential surface thereof, the plurality of protuberances being proximally spaced from the distal end of the body.

11. A probe cover as recited in claim 10, wherein the protuberances are configured to facilitate nesting of a second probe cover.

12. A probe cover as recited in claim 11, wherein the body defines a plurality of protuberances projecting from an inner surface thereof and being proximally spaced from the distal end of the body, the protuberances being configured to facilitate nesting with a third probe cover.

13. A probe cover comprising:
a tubular body portion extending in a tapered configuration from a proximal end to a distal end, the proximal end defining an opening configured for receipt of a distal end of a tympanic thermometer, and the distal end being substantially enclosed by a film and including a plurality of non-continuous end ribs being circumferentially spaced apart and disposed about an inner circumferential surface thereof, the end ribs having a longitudinal portion extending proximally along the tubular body portion and a transverse portion being transverse relative to the longitudinal axis of the tubular body and projecting along a transverse surface of the film, the longitudinal portion and the transverse portion being configured to receivably engage the distal end of the tympanic thermometer for support therein such that the distal end of the tympanic thermometer is spaced apart from the film at a predetermined space, wherein the predetermined space is defined by a thickness of the transverse portion.

14. A probe cover comprising:
a tubular body portion extending in a tapered configuration from a proximal end to a distal end, the proximal end defining an opening configured for receipt of a distal end of a tympanic thermometer, and the distal end being substantially enclosed by a film and including a plurality of non-continuous end ribs being circumferentially spaced apart and disposed about an inner circumferential surface thereof, the end ribs having a longitudinal portion extending proximally along the tubular body portion and a transverse portion being transverse relative to the longitudinal axis of the tubular body and projecting along a transverse surface of the film, the longitudinal portion and the transverse portion being configured to receivably engage the distal end of the tympanic thermometer for support therein such that the distal end of the tympanic thermometer is spaced apart from the film at a predetermined space, wherein the predetermined space is determined by the location of the transverse portion relative to the longitudinal axis of the tubular body.

\* \* \* \* \*